United States Patent
Mwikalo et al.

(10) Patent No.: US 6,480,508 B1
(45) Date of Patent: Nov. 12, 2002

(54) ROUTER-BASED DOMAIN NAME SYSTEM PROXY AGENT USING ADDRESS TRANSLATION

(75) Inventors: Rama Mwikalo, Naperville, IL (US); John Ronk, Oak Park, IL (US); John Whittington, Lombard, IL (US); Manuel Ricardo Saiz, Naperville, IL (US)

(73) Assignee: Westell, Inc., Aurora, IL (US)

( * ) Notice: Subject to any disclaimer, the term of this patent is extended or adjusted under 35 U.S.C. 154(b) by 0 days.

(21) Appl. No.: 09/310,188

(22) Filed: May 12, 1999

(51) Int. Cl.[7] ............... G06F 13/00; G06F 15/16
(52) U.S. Cl. ............... 370/475; 709/245; 709/401
(58) Field of Search ................ 370/389, 400, 370/401, 411, 475; 709/201, 202, 203, 217, 218, 219, 220, 227, 229, 230, 238, 245; 707/3, 10

(56) References Cited

U.S. PATENT DOCUMENTS

| | | | |
|---|---|---|---|
| 5,434,974 | A | 7/1995 | Loucks et al. |
| 5,550,981 | A | 8/1996 | Bauer et al. |
| 5,636,216 | A | 6/1997 | Fox et al. |
| 5,724,510 | A | 3/1998 | Arndt et al. |
| 5,729,689 | A | 3/1998 | Allard et al. |
| 5,751,961 | A | 5/1998 | Smyk |
| 5,751,971 | A | 5/1998 | Dobbins et al. |
| 5,754,547 | A | 5/1998 | Nakazawa |
| 5,777,989 | A | 7/1998 | McGarvey |
| 5,790,548 | A | 8/1998 | Sistanizadeh et al. |
| 5,793,763 | A | 8/1998 | Mayes et al. |
| 5,802,285 | A | 9/1998 | Hirviniemi |
| 5,805,820 | A | 9/1998 | Bellovin et al. |
| 5,812,819 | A | 9/1998 | Rodwin et al. |
| 5,835,725 | A | 11/1998 | Chiang et al. |
| 5,838,718 | A | 11/1998 | Blewett |
| 6,014,660 | A * | 1/2000 | Lim et al. ............... 707/10 |
| 6,205,489 | B1 * | 3/2001 | Kapoor ............... 709/245 |
| 6,324,582 | B1 * | 11/2001 | Sridhar et al. ............... 709/228 |
| 6,421,732 | B1 * | 7/2002 | Alkhatib et al. ............... 709/245 |

* cited by examiner

Primary Examiner—Ricky Ngo
(74) Attorney, Agent, or Firm—Pennie & Edmonds LLP

(57) ABSTRACT

A Domain Name System (DNS) proxy agent of the present invention performs a name query relaying function by redirecting DNS queries and responses to their final destination address, which is unknown to the node which originated the query or response. The real source and destination nodes are known only to the DNS proxy agent. This allows network address of an Internet-based name server to be changed without the requirement to reconfigure the DNS addressed on the LAN-based host.

5 Claims, 5 Drawing Sheets

ROUTER-BASED DOMAIN NAME SYSTEM PROXY AGENT USING ADDRESS TRANSLATION

RELATED APPLICATIONS

None

TECHNICAL FIELD

The present invention is directed to the field of telecommunications in which data packets or other messages are routed to a destination whose network address must be resolved. The invention system is applicable to packet-mode access and transport systems, including local area networks, metropolitan area networks and wide area networks and especially the Internet and its router-based inter networking services.

BACKGROUND OF THE INVENTION

In internet service, a domain name address is used to uniquely identify a host instead of using the host's IP address. This is because the host's domain name address, e.g., <hostpc>@<domain>.com is easier to remember than the host's IP address which is denoted in the form of, say, <192.302.0.12>. The relationship between the domain name and the IP address is analogous to the relationship between one's street address and the 9-digit zip code. Therefore, when one wishes to send a message, the recipient's domain address is used instead of the IP address. This is simply because it is easier to remember a domain name having a meaningful connotation, than it is to remember a string of up to twelve, or even more, random digits representing the recipient's IP address.

However, internet routers which deliver messages and other internet traffic, do not recognize domain name addresses. Instead, they use the IP address. Therefore, when a local host, e.g., <source_host>@<domainl>.com addresses a message to a remote host, e.g., <destination_host>@<domain2>.com, the latter's domain name address must first be translated into an IP address before the local host's router can deliver the packet to the internet to start its journey to the receiving host.

To facilitate such addressing, the internet has implemented an automatic domain-name to IP-address database lookup service, commonly known as the Domain Name System (DNS) server. The DNS is the internet standard mechanism for domain name registration and address resolution. Each local host attached to the internet is configured with a primary and secondary (backup) DNS address. These addresses correspond to primary and secondary servers to which local host's DNS address translation queries are directed. Each DNS servers comprises a database which maps internet domain names to their corresponding IP addresses.

To determine the destination host's IP address when the domain name is known, the local host sends a DNS query to the designated primary DNS server. The primary DNS server consults its database and responds with the IP address. The local host then uses the returned IP address to route the message to the destination host, whose internet domain name address was known. If the primary DNS server cannot resolve the IP address, or does not respond for some other reason, the secondary DNS server is automatically requested to respond.

An internet host's DNS addresses are typically entered manually as part of that host's service configuration. Manual entry of the DNS address presents some serious operational problems especially in a service configuration that involves multiple hosts and multiple service providers with Network Address Translation (NAT). For example, in a home with two host PCs designated PC1 and PC2, PC1 may be used for telecommuting or work at home via a corporate LAN, while PC2 may be used for regular internet access via an Internet Service Provider (ISP). In such case, PC1 and PC2 must be configured with a different DNS address associated with the corresponding service provider (the corporate LAN for telecommuting access) or the ISP (for Internet access). If a particular host wishes to have access to either the corporate LAN or the ISP, some method of associating specific local DNS requests with global DNS addresses is required. Configuring the DNS addresses manually each time access is switched from the corporate LAN to the ISP and vice versa, is inconvenient and time consuming. When tens or hundreds of hosts are involved, as is the case of users on a corporate LAN for example, the situation can become quite unmanageable.

The prior art teaches a number of methods and systems for assigning and maintaining IP addresses and name resolution. These include proxy schemes, naming protocols and connection protocols, among others.

U.S. Pat. No. 5,835,725 discloses an address assignment scheme for a local network. The end-station, usually a PC or a workstation, issues an address assignment request to a router, or other intermediate node. In response, the router chooses an address from a pool of MAC addresses allocated to the router and assigns it to the workstation.

U.S. Pat. No. 5,835,718 discloses a pseudo-proxy server that proxies for HTML pages that it is hosting. The proxy server maps a remote domain URL to a local domain URL, thereby making the remote URL appear local to its local users. A local user simply clicks on a local URL to access a remote URL. Once the remote URL is known, the pseudo-proxy server then translates the remote URL into the IP address of the remote host.

U.S. Pat. No. 5,777,989 is directed to handling a name resolution query issued by a local TCP/IP host which is connected to a plurality of networks. The '989 patent teaches simultaneously broadcasting the name resolution query to the primary domain name servers of each of the networks to which the host is connected. If no reply is received then the alternate DNS for each network (if available) is queried.

U.S. Pat. No. 5,754,547 is directed to routing method and system for a network comprising a plurality of subnetworks (e.g., LANs) connected by a number of routing devices (e.g., routers) in which one may freely alter the connection of a local host without necessitating the modification of IP addresses. When a local host is connected to a subnetwork, the routing device associated with that subnetwork updates a table which keeps track of the IP address of the new local host and the time at which the new local host was connected thereto (the "connection time"). The routing device sends a subscriber signal comprising the host's address and connection time to the remaining routing devices, which compare the connection time within the subscriber signal with the connection time within their own tables, to update this information.

U.S. Pat. No. 5,751,971 discloses a system in which multiple router interfaces are assigned the same IP network address to create an IP work group. This allows a host to be relocated anywhere in the work group without requiring reconfiguration of the host.

U.S. Pat. No. 5,729,689 discloses a naming proxy agent which operates as a translator between network nodes practicing incompatible network naming protocols. As disclosed in the '689 patent, the broadcast node ("b-node") naming protocol used in TCP/IP networks, can be used to obtain the address corresponding to a node name by broadcasting a "where is" query with the name of the node whose network address it desires. Similarly, a point-to-point node (p-node) naming protocol is used by a p-node to obtain the address corresponding to a name by sending a query to a "name server". The b-node and the p-node protocols are distinct and incompatible naming protocols. A first station utilizing the b-node naming protocol cannot obtain the network address for p-nodes. Similarly, b-nodes cannot obtain the network address for non-local addresses since b-nodes broadcast name queries only locally. The proxy agent in the '689 patent translates a first name query protocol into a second name query protocol to allow otherwise incompatible network nodes to communicate with one another.

U.S. Pat. No. 5,636,216 is directed to a system in which a local network is connected to other networks via a gateway node, the local network including nodes which cannot monitor all the other nodes in the local network. The IP address of a target node in the local network is translated at the gateway node to a network-specific local address of the target node without broadcasting. The network specific local address of the target node is the address which is usable within the local network for forwarding a packet to the target node.

U.S. Pat. No. 5,434,974 is directed to a system for assigning unique names in a network to facilitate name resolution.

SUMMARY OF THE INVENTION

In the present invention, a node on a local network, which knows the internet address of a remote node, but not its IP address, originates a DNS query by sending the query to a DNS proxy agent connected to the local network. The DNS proxy agent redirects the DNS query to the proper destination address. The IP addresses of the real source and destination nodes are known only to the DNS proxy agent. This allows the network address of an internet-based name server to be changed without having to reconfigure the DNS address on the LAN-based host. Thus, the present invention is intended to eliminate the need to manually re-configure the primary and secondary DNS server addresses when a single or multiple hosts share the same router to access the internet via multiple service providers.

In the present invention, each host on a LAN is configured with a fixed local (i.e., unregistered) DNS address. The local DNS address corresponds to an address of the router and so all DNS requests from a host on the LAN goes to the router. A DNS proxy agent implemented in the router simulates a DNS serve function in the router. The DNS proxy agent intercepts all local DNS requests addressed to the router, and translates these requests into global DNS requests. The proxy agent then forwards the requests to the DNS servers. Thus, the DNS proxy agent automatically performs the required mapping between the local DNS address and the global DNS address, and vice versa.

In one aspect of the present invention, the router itself is programmed to automatically obtain the latest global DNS address using IPCP whenever a PPP session is launched. Thus, neither the router nor the hosts need to be manually configured, when the global DNS address is changed at the service provider.

In another aspect of the present invention, the router uses Internet Protocol Control Protocol (IPCP) as defined in RFC-1877, or other standard mechanism, to automatically obtain the global DNS address from the service provider. Therefore, the DNS address can be directly associated with the physical or virtual connection to the service provider. Therefore, when a host selects one of the connections to access the internet or the corporate LAN, the host will be associated with the DNS address assigned to that interface via IPCP.

BRIEF DESCRIPTION OF THE DRAWINGS

The present invention can better be understood through the attached figures in which.

DETAILED DESCRIPTION OF THE PREFERRED EMBODIMENT

Figure 1:
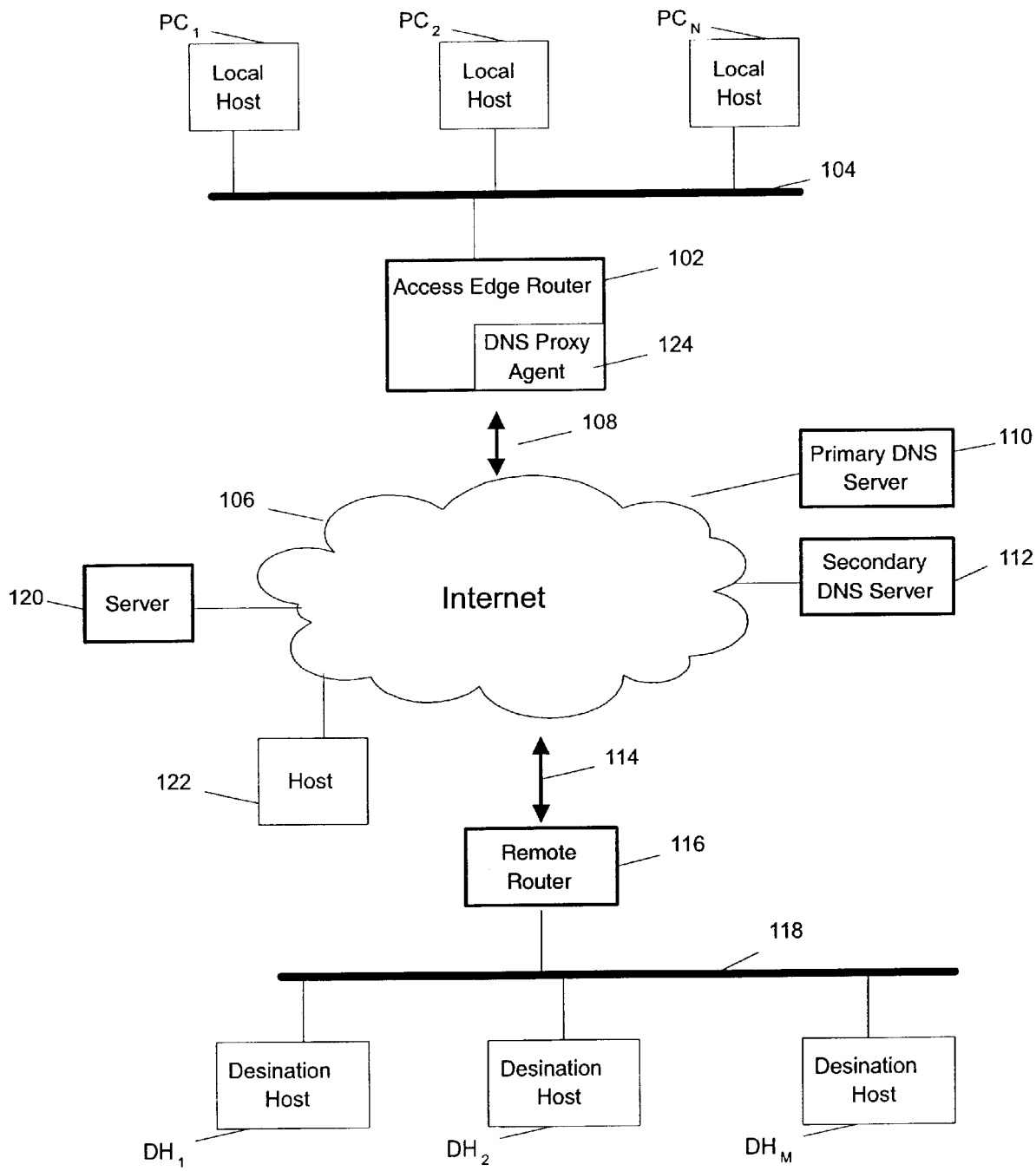
FIG. 1 shows an internet access system in accordance with the present invention.

FIG. 1 shows the main components involved in the preferred embodiment of the present invention. A local access edge router 102, preferably a generic Digital Subscriber Line (xDSL) router such as Westell's 36R200 and 36R500 routers, is connected to a number of local hosts PC1, PC2, . . . PCN via a local area network 104. In the typical situation, the router 102 and the local hosts are located proximate one another at the customer site.

The local area network 104 can be an ethernet, as shown in FIG. 1, but a single computer or any type of system that inter-connects a number of hosts form a computer network will suffice. Examples of such networks include token ring LANs, Metropolitan LANs such as CATV systems, and wireless LANS, among others. The router 102 is connected to the internet 106 via a link 108, preferably a twisted pair, and thus provides the local hosts with shared access to the internet. The link 108 may be by way of an internet service provider (ISP), a corporate LAN, or other access provider.

Attached to the internet 106, either directly as shown, or, more preferably, indirectly, are at least one primary DNS server 110 and one secondary DNS server 112. DNS servers 110, 112 are typically located at physically different sites on the internet for redundancy backup. Although only two DNS servers are shown, in general, there are many such DNS servers connected to the internet 106 to facilitate translation of an internet address to an IP address by providing name look-up services. As discussed above, an internet service provider or a corporate LAN may have its own primary and secondary DNS servers for the benefit of its users, although this is not a requirement for the present invention.

Also connected to the internet via a second link 114, which may also be via an ISP, corporate LAN or other access provider, is a remote access edge router 116. The remote router 116 may be connected to a plurality of hosts DH1, DH2, . . . DHm via its own local area network 118. Also connected to the internet 106 may be additional server computers 120 and host computers 122, all familiar to those skilled in the art.

Thus far, the description of FIG. 1 is all in the prior art. In accordance with the present invention, however, the local access edge router 102 is advantageously further provided with a DNS proxy agent 124. The DNS proxy agent is generally implemented in software and executes on at least one computer associated with the router 102. The DNS proxy agent 124 assists in communications between the local host computers PCi and other computers connected to the internet by providing address translation services in the manner described below. While the DNS proxy agent 124 is shown in FIG. 1 to reside only in local access edge router 102, it should be kept in mind that it may also be provided to remote router 116, so as to provide multiple sites with mutual capabilities of the present invention.

Figure 2:
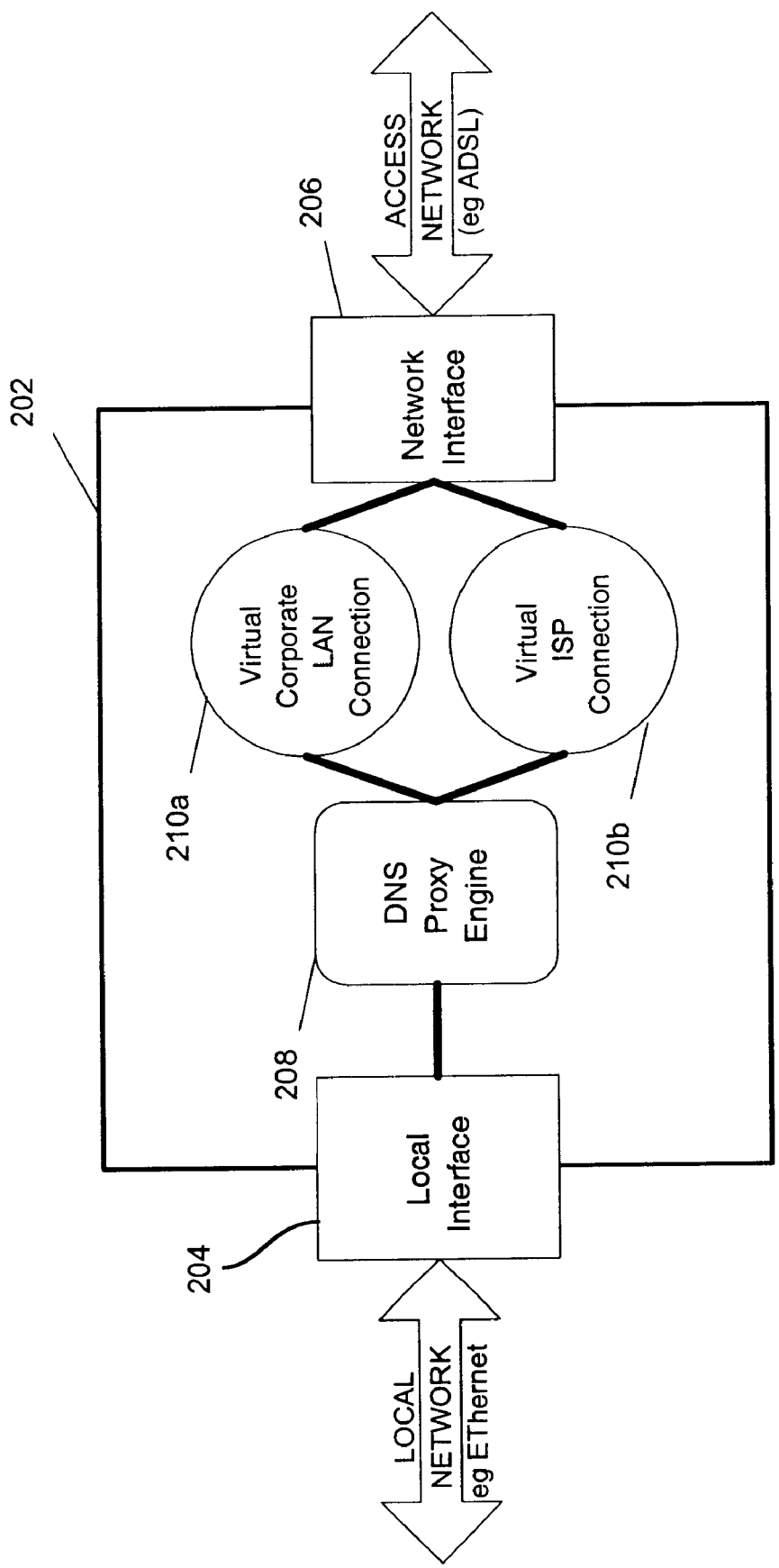
FIG. 2 figuratively illustrates a network access router having the DNS proxy function of the present invention.

FIG. 2 shows an access device 202, preferably a router, configured with the DNS proxy agent of the present invention. The router 202 has a first, local network interface 204, and a second, wide area network (WAN) interface 206. In the preferred embodiment, the local network interface 204 can be one of several types, including an Ethernet 10 Base-T as specified in IEEE 802.3, a token ring as specified in IEEE 802.5 or a CATV network, although the particular local interface used is not critical. In the preferred embodiment, the wide area network interface can be xDSL, including ADSL, SDSL, HDSL and VDSL, T1/E1, T3/E3, a coaxial-based interface such as in CATV, a fiber-based interface such as OC-3, and the like. The local hosts interface with the DNS proxy engine 208, which is preferably implemented in software, via the local network.

Even if only one physical WAN connection is supported by the router or other access device, multiple virtual connections to the various service providers may be supported through the ILEC (Incumbent Local Exchange Carrier) or CLEC (Competitive Local Exchange Carrier) access network. For instance, as seen in FIG. 2, a corporate LAN logical interface 210*a* and an ISP logical interface 210*b* are supported and maintained by the DNS proxy engine software resident in the router 202. This feature is facilitated by the router's configuration which, in the present invention, supports PPP access with the PPP stack terminating in the router. This allows a single global network address assigned to each virtual network connection on the WAN to be shared by all the local hosts on the local network.

In the present invention, if a local host sends a DNS query via the corporate LAN, the DNS proxy engine 208 uses the global network address assigned by the corporate LAN, and if the local host sends the DNS query via the ISP, the DNS proxy engine 208 uses the global network address assigned by the ISP. And this holds for each of the local hosts. Network address sharing implies that each local host is assigned an unregistered IP address for use only within the local network. Therefore, in the present invention, the router preferably supports Network Address Translation (NAT) and Port Address Translation (PAT) for packets that are exchanged between the local hosts and the internet-based hosts.

As part of the initial configuration, the router is assigned two local DNS addresses, each local address corresponding to one of the primary and secondary DNS server address. These locally assigned DNS addresses are configured into each of the local hosts on the LAN and only have local significance. When a local host sends a DNS query, it is sent to the local primary or the secondary address, and so the request packets are intercepted and processed by the proxy agent in the router.

Figure 3:
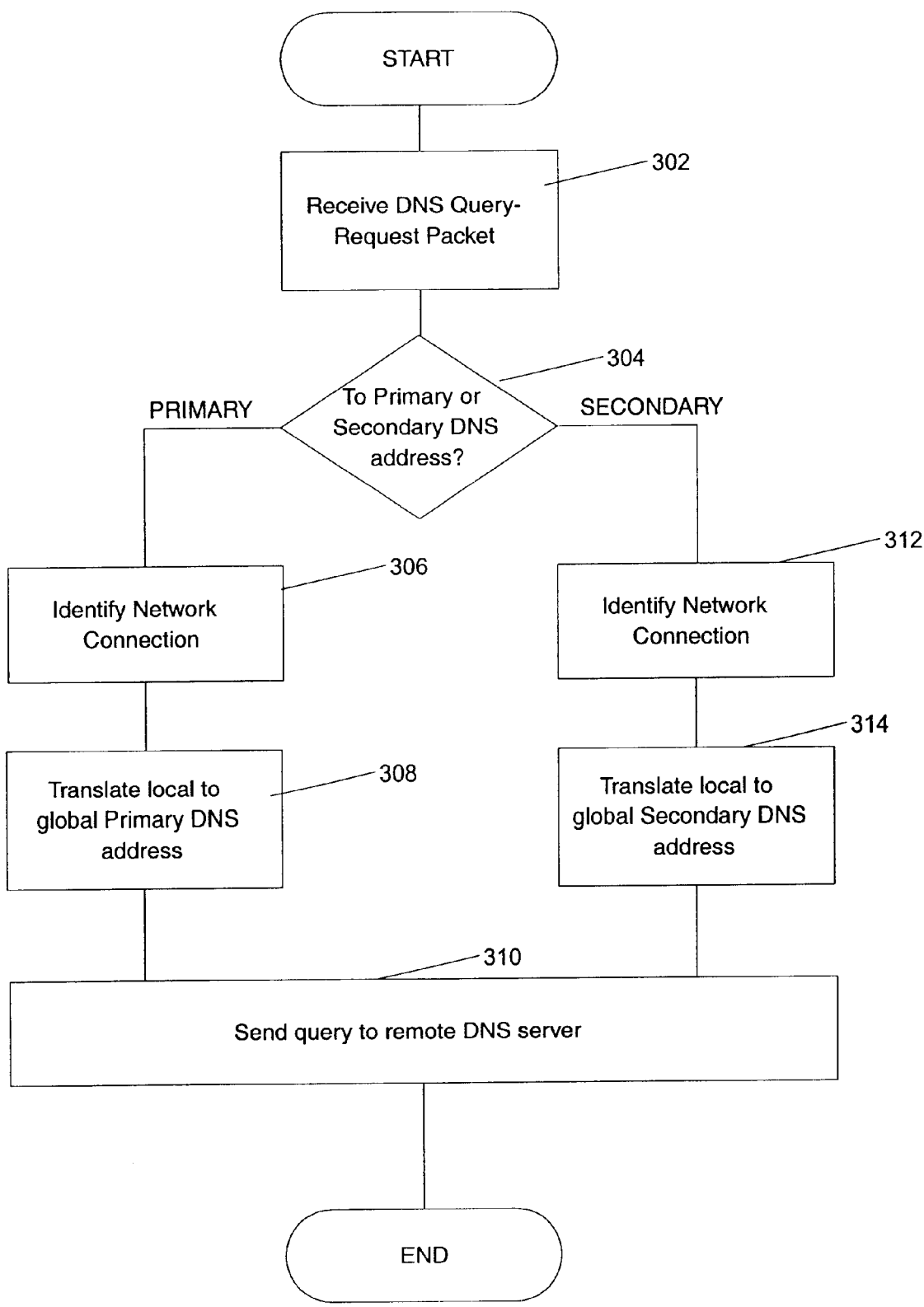
FIG. 3 is a flow chart showing the processing of a DNS query request from a local host by the router-based proxy agent.

FIG. 3 presents a flow chart 300, illustrating the operation of the DNS proxy agent when processing a DNS query packet. In step 302, the proxy agent receives the DNS query request packet from the local host. In step 304, the proxy agent determines whether the primary or the secondary local DNS address has been used by the host. If the primary local DNS address was used, control transfers to step 306 in which the proxy agent identifies the network connection to be used. Control then proceeds to step 308 in which the proxy agent translates the local primary DNS address to a global primary DNS address, preferably by consulting a look-up table stored in a non-volatile memory associated with the router. After translating the local primary DNS address, control flows to step 310 in which the router sends the query to the remote DNS server having the corresponding global primary DNS address. If, at step 304, the proxy agent determines that the secondary local DNS address has been specified by the local host, control transfers to steps 312 and 314, which are the secondary DNS address counterparts of steps 306 and 308, respectively. In either case, the query message is sent to the appropriate DNS server.

Figure 4:
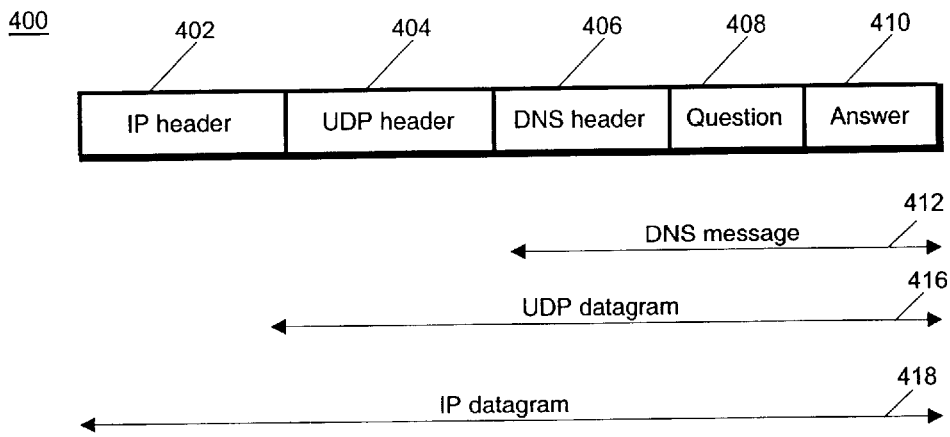
FIG. 4 illustrates the DNS message encapsulation in a UDP/IP packet.

FIG. 4 shows the format of a UDP/IP encapsulated DNS message 400. The message comprises an IP header 402, a UDP header 404, a DNS header 406, the query 40 and the response 410. Of these, the DNS header, the query and the response form the DNS message 412; the DNS message 412 and the UDP header 404 form the UDP datagram 414; and the UDP datagram and the IP header from the IP datagram 418.

Figure 5:
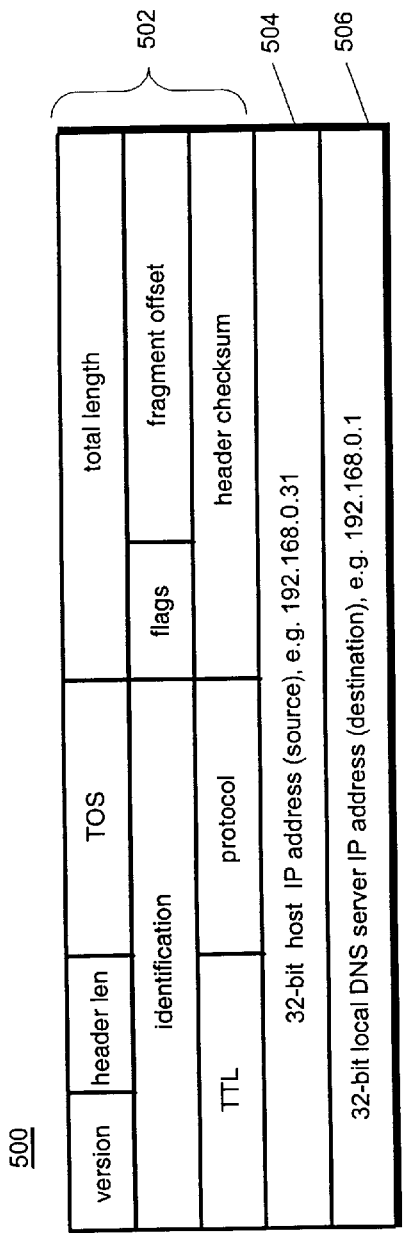
FIG. 5 is an IP packet header sent by a local host making a DNS request.

FIG. 5 shows a sample format of an IP packet header 500 (402) of a query sent by a requesting local host to a DNS proxy agent in accordance with the present invention. The IP packet header includes a number of standard fields 502, along with the 32-bit local host's IP address 504 (source) and the 32-bit local DNS server IP address 506 (destination). The router recognizes the local DNS server's IP address and this invokes the DNS proxy agent.

After receiving the DNS query, the DNS proxy agent translates the source address of the DNS query packet into the global address of the router, as assigned by the service provider through PPP. This ensures that any response from the service provider returns to the router. The proxy agent also translates the destination address of the DNS query packet into the global DNS address assigned to the network interface. As is known to those skilled in the art, the global DNS address typically is automatically assigned to each router network connection using protocols such as Internet Protocol Control Protocol (IPCP) extensions, as specified in RFC-1877. Alternatively, the global DNS address for each network connection on the router may be manually assigned.

Figure 6:
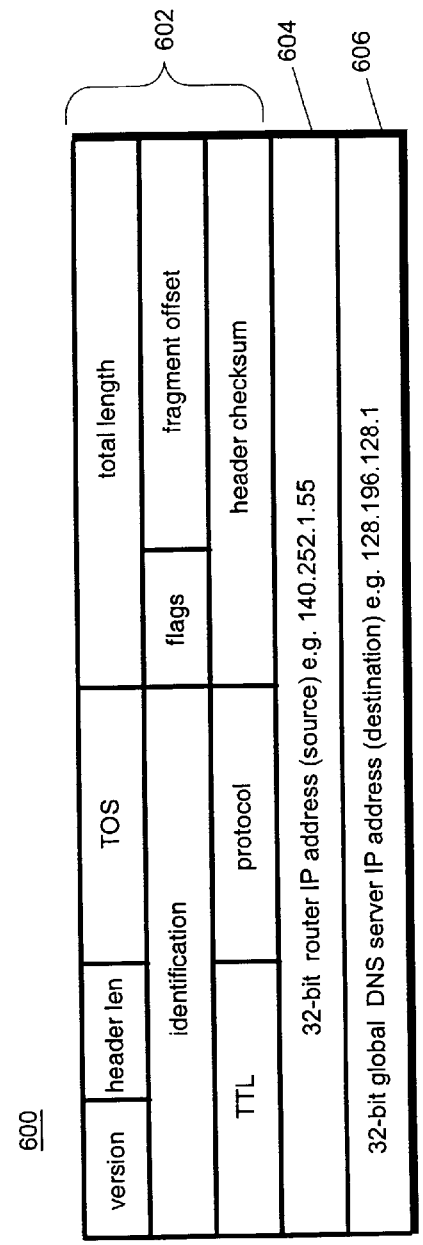
FIG. 6 is an IP packet header after address translation by the router.

FIG. 6 shows the translated IP packet 600 which is sent by the DNS proxy agent. The translated IP packet has standard fields 602, the 32-bit router IP address 602 (translated source) and 32-bit global DNS server IP address (translated destination) 606. As is known to those skilled in the art, the global DNS server receives the translated IP packet, typically via the internet, and sends a DNS response to the router, in a well-established manner using one of several protocols.

Figure 7:
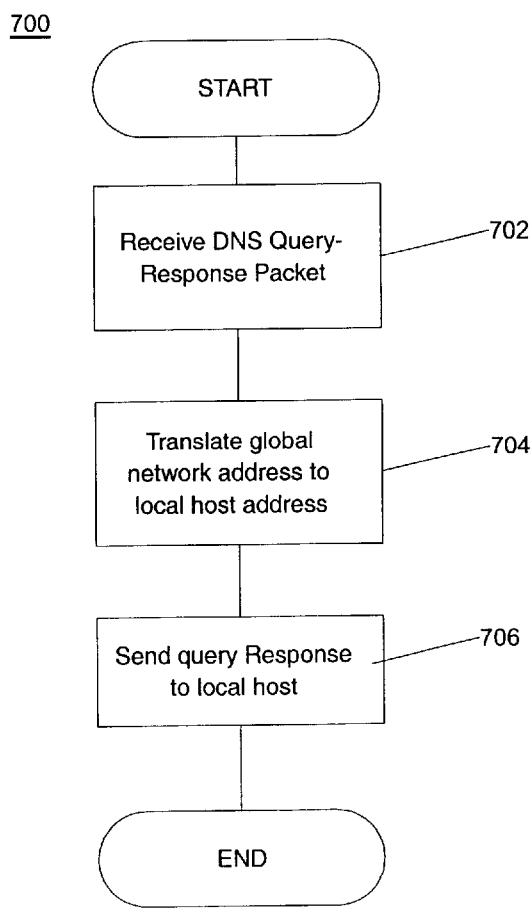
FIG. 7 is a flow chart showing the reception of a DNS query response from an Internet-based DNS server by the router-based proxy agent.

FIG. 7 shows a flow chart 700 illustrating the operation of the DNS proxy agent when processing a DNS response from the selected primary or secondary DNS server. In step 702, the router receives the DNS query response in the form of one or more packets addressed to the router's global network address. In step 704, the router translates the global network address into the requesting local host's address. This function is preferably implemented by Network Address Translation (NAT) as specified in RFC-1631, and Port Address Translation (PAT). Finally, in step 706, the router forwards the query response to the requesting local host which originally made the DNS request.

Router manufacturers can pre-configure routers with default primary and secondary local DNS server addresses. Once the router is deployed, these addresses are entered into each host on the associated local network. Thereafter, no further DNS configuration changes are required at the host level. This holds whether the user wishes a particular local host to connect to a different service provider, or the global DNS address is changed at the service provider.

As discussed above, any changes to the global DNS addresses will be automatically handled by the DNS proxy agent in the router. For instance, When PPP is supported on the router WAN interfaces, IPCP can be used to automatically determine the global primary and secondary DNS addresses associated with each service provider connection. This obviates the need to manually reconfigure the global DNS addresses of each local host.

The router should preferably be able to respond to Address Resolution Protocol (ARP) requests directed to the proxy DNS server primary and secondary addresses to allow hosts to determine the MAC address of the proxy DNS server. It is possible that there will be an address conflict between the router and a local host when the proxy DNS addresses are pre-configured at the factory. Such conflicts can be resolved by requiring the router to send an ICMP ECHO REQUEST to each of local host using its assigned addresses and monitoring the ECHO REPLY. When the router detects a duplicate address, it can send an address conflict notification to the host having the conflicting address. In addition, the route may monitor for address conflicts "on the fly" by comparing the source IP address in each packet received from a host with the router's own configured local DNS server addresses.

Finally, it should be noted that it is possible to implement the present invention using address translation other than the NAT scheme proposed in RFC-1631 and still achieve the benefit of simplified DNS address management on a LAN. However, when NAT and PAT are utilized, DNS address management on a local network is simplified, and the use of unregistered network addresses as specified in RFC-16531 helps solve the IP address scarcity problem.

While the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A computer communication system comprising
    a first network having connected thereto at least one primary domain name system (DNS) server having a global primary DNS address and at least one secondary DNS server having a global secondary DNS address;
    a local network having connected thereto at least one local router and a plurality of local host computers, the router configured to provide said plurality of local host computers with access to said first network; wherein
        said local router stores said global primary and secondary DNS addresses;
        said local hosts each store at least one local primary and secondary DNS addresses corresponding to said global primary and secondary DNS addresses, respectively, which are stored in said local router; and
    a software DNS proxy agent associated with said local router is programmed to receive a DNS look-up request from one of said local hosts specifying a local primary or secondary DNS address, and transmit said DNS look-up request to a designated primary or secondary DNS server via said first network, based on corresponding said global primary or secondary DNS address stored in said local router.

2. The computer communication system of claim 1, wherein the router supports network address translation and port address translation protocols.

3. A method of communication for a local network having at least one local host and one local router connected thereto, the method comprising:
    storing in a local router, global primary and secondary domain name system (DNS) addresses of global primary and secondary DNS servers;
    storing in a local host, at least one local primary and secondary DNS addresses corresponding to said global primary and secondary DNS addresses, respectively, which are stored in said local router;
    receiving at the local router, a DNS look-up request from said local host specifying a local primary or secondary DNS address, and
    transmitting said DNS look-up request to a designated global primary or secondary DNS server, based on corresponding said global primary or secondary DNS addresses stored in said local router.

4. The method of claim 3, wherein said steps of receiving and transmitting are performed by in software.

5. The method of claim 3, wherein said local router supports network address translation and port address translation.

* * * * *